United States Patent
Ben-David

(10) Patent No.: US 12,207,095 B2
(45) Date of Patent: Jan. 21, 2025

(54) SUBSCRIBER IDENTITY MODULE (SIM) BASED APPLICATION ACTION AUTHENTICATION

(71) Applicant: Unibeam Ltd., Hod-HaSharon (IL)

(72) Inventor: Ran Ben-David, Hod-HaSharon (IL)

(73) Assignee: Unibeam Ltd., Hod-HaSharon (IL)

( * ) Notice: Subject to any disclaimer, the term of this patent is extended or adjusted under 35 U.S.C. 154(b) by 451 days.

(21) Appl. No.: 17/667,597

(22) Filed: Feb. 9, 2022

(65) Prior Publication Data

US 2023/0254696 A1   Aug. 10, 2023

(51) Int. Cl.
*H04W 12/47*      (2021.01)
*H04L 9/32*       (2006.01)
*H04L 51/02*      (2022.01)
*H04W 12/71*      (2021.01)

(52) U.S. Cl.
CPC .......... *H04W 12/47* (2021.01); *H04L 9/3239* (2013.01); *H04L 51/02* (2013.01); *H04W 12/71* (2021.01)

(58) Field of Classification Search
CPC .... H04W 12/47; H04W 12/71; H04L 9/3239; H04L 51/02
USPC ....................................................... 455/41.1
See application file for complete search history.

(56) References Cited

U.S. PATENT DOCUMENTS

| | | | |
|---|---|---|---|
| 9,338,647 B2 * | 5/2016 | Spitz | H04W 12/08 |
| 10,826,704 B2 * | 11/2020 | Burke | H04W 12/40 |
| 2007/0154014 A1 * | 7/2007 | Aissi | G06F 21/445 |
| | | | 380/46 |
| 2015/0201324 A1 * | 7/2015 | Hauck | H04W 8/265 |
| | | | 455/418 |
| 2016/0212129 A1 * | 7/2016 | Johnston | G06F 21/73 |
| 2020/0280441 A1 * | 9/2020 | Ben-David | H04W 12/48 |
| 2020/0344602 A1 * | 10/2020 | Li | H04L 67/125 |
| 2020/0391695 A1 * | 12/2020 | Yang | G06F 21/35 |
| 2021/0400479 A1 * | 12/2021 | Li | H04W 12/72 |
| 2022/0078029 A1 * | 3/2022 | Galdo | H04L 9/3265 |
| 2022/0385483 A1 * | 12/2022 | Tschofenig | H04L 9/0877 |
| 2023/0020843 A1 * | 1/2023 | Bowers | G06F 21/32 |
| 2023/0413048 A1 * | 12/2023 | Yoo | H04W 12/35 |
| 2024/0185245 A1 * | 6/2024 | Sibert | G06Q 20/40145 |

FOREIGN PATENT DOCUMENTS

| | | | | |
|---|---|---|---|---|
| GB | 2528043 A | * | 1/2016 | ............. G06F 21/35 |
| WO | WO-2021031051 A1 | * | 2/2021 | ........... H04L 9/0844 |

\* cited by examiner

*Primary Examiner* — Mong-Thuy T Tran

(57) ABSTRACT

There is provided a method for on-device verification, comprising: using at least one processor of a mobile device for: executing an application, establishing a communication with an applet stored in a storage component of circuitry installed in the mobile device, obtaining an indication that the mobile device is authenticated for cellular communication by a service provider, and validating a process of the application based on the indication.

27 Claims, 4 Drawing Sheets

SUBSCRIBER IDENTITY MODULE (SIM) BASED APPLICATION ACTION AUTHENTICATION

FIELD AND BACKGROUND OF THE INVENTION

The present invention, in some embodiments thereof, relates to cybersecurity and, more specifically, but not exclusively, to systems and methods for identity verification.

Access to network-based services requires verification of an identity in order to be performed securely. For example, logging into a bank web site may be done by the user entering a password. An online purchase may be further secured by sending a one-time password (OTP) such as a PIN number to a smartphone of the user. The user enters the OTP number as a verification. In another example, a user logs into a game server to play a game using user credentials that identify the user.

SUMMARY OF THE INVENTION

According to a first aspect, a method for on-device verification, comprises: using at least one processor of a mobile device for: executing an application, establishing a communication with an applet stored in a storage component of circuitry installed in the mobile device, obtaining an indication that the mobile device is authenticated for cellular communication by a service provider, and validating a process of the application based on the indication.

According to a second aspect, a system for on-device verification, comprises: at least one processor of a mobile device executing instructions for: executing an application, establishing a communication with an applet stored in a storage component of circuitry installed in the mobile device, obtaining an indication that the mobile device is authenticated for cellular communication by a service provider, and validating a process of the application based on the indication.

According to a third aspect, a non-transitory medium of a mobile device storing program instructions for on-device verification, which, when executed by a processor of the mobile device, cause the processor to: execute an application, establish a communication with an applet stored in a storage component of circuitry installed in the mobile device, obtain an indication that the mobile device is authenticated for cellular communication by a service provider, and validate a process of the application based on the indication.

In a further implementation form of the first, second, and third aspects, further comprising executing instructions of the applet for: receiving a validation request from the application, and providing the indication that the mobile device is authenticated to the application, wherein the indication comprises a validation token based on a unique identifier that uniquely identifies the circuitry.

In a further implementation form of the first, second, and third aspects, the process of the application comprises a secure service dependent on the mobile device having the circuitry installed therein and being authenticated for cellular communication.

In a further implementation form of the first, second, and third aspects, the validating the process is further performed by a notification generated by the applet presented on a display of the mobile device, wherein the notification triggers validation the process of the application in response to an approval indication entered by a user.

In a further implementation form of the first, second, and third aspects, the indication comprises a unique identifier that is shared with a registration server during registration of the applet running on the mobile device authenticated for cellular communication, wherein the application performs the validating by verifying that the indication matches a reference token computed based on the shared unique identifier obtained from the registration server, wherein the match indicates that the application is running on the mobile device with same circuitry that has been used for registration.

In a further implementation form of the first, second, and third aspects, further comprising:

in response to a validation request from the application, analyzing at least one parameter of the mobile device, determining likelihood that a human user is using the mobile device according to the analysis, and validating the process in response to the determination that the human user is likely using the mobile device.

In a further implementation form of the first, second, and third aspects, the at least one parameter is selected from a group consisting of: calls made using the circuitry of the authenticated mobile device, text messages sent using the circuitry of the authenticated mobile device, location of the mobile device has changed during a recent time interval, and data downloaded over a cellular network using the circuitry of the authenticated mobile device.

In a further implementation form of the first, second, and third aspects, further comprising wherein in response to an analysis of the at least one parameter indicating non-likelihood that the human user is using the mobile device, the applet comprises instructions for terminating the validation of the process and sending an alert to at least one of the application and a service server.

In a further implementation form of the first, second, and third aspects, the indication comprises a unique identifier that is shared with a service server, wherein the validating the process is performed by the service server by verifying that a validation token computed from the unique identifier obtained from the applet matches a reference token computed from the shared unique identifier, wherein in response to the validating by the service server, the application is granted access to a service hosted by the server.

In a further implementation form of the first, second, and third aspects, the match between the validation token and the reference token indicates that the application is loaded on the mobile device with circuitry installed thereon that is authenticated for cellular communication, wherein the circuitry installed in the mobile device was used to generate the unique identifier during a registration process.

In a further implementation form of the first, second, and third aspects, the indication comprises a validation token, and further comprising executing instructions of the applet for: computing the validation token from a unique identifier that uniquely identifies the circuitry and metadata obtained from the application, wherein the unique identifier and the metadata are shared with the service server, and wherein the service server validates that the validation token matches a reference token computed from the shared unique identifier and from the shared metadata.

In a further implementation form of the first, second, and third aspects, further comprising executing instructions of the applet for computing the validation token as a hash of the unique identifier and the metadata, wherein the service server validates that the validation token matches the reference token computed as a hash of the shared unique identifier and the shared metadata.

In a further implementation form of the first, second, and third aspects, the metadata comprises challenge data obtained from the service server in response to an attempt by the application to access a service hosted by the service server.

In a further implementation form of the first, second, and third aspects, the metadata comprises transaction data associated with a transaction which is being attempted to be performed by the application accessing the service server.

In a further implementation form of the first, second, and third aspects, the application sends a message to the service server, the message including the validation token and the transaction data, wherein the service server validates that the validation token matches the reference token computed from the shared unique identifier and from the transaction data included in the message.

In a further implementation form of the first, second, and third aspects, in response to the validation of the transaction, the service server further performs the transaction using the transaction data included in the message.

In a further implementation form of the first, second, and third aspects, the metadata comprises user credentials used by a user to register for the service hosted by the service server, wherein the validation by the service server indicates that a user is using the same user credentials with the same authenticated mobile device to access the service that were used to register for the same service.

In a further implementation form of the first, second, and third aspects, the validation by the service server indicates non-likelihood that the application is a bot that is automatically attempting to access the service over a network.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
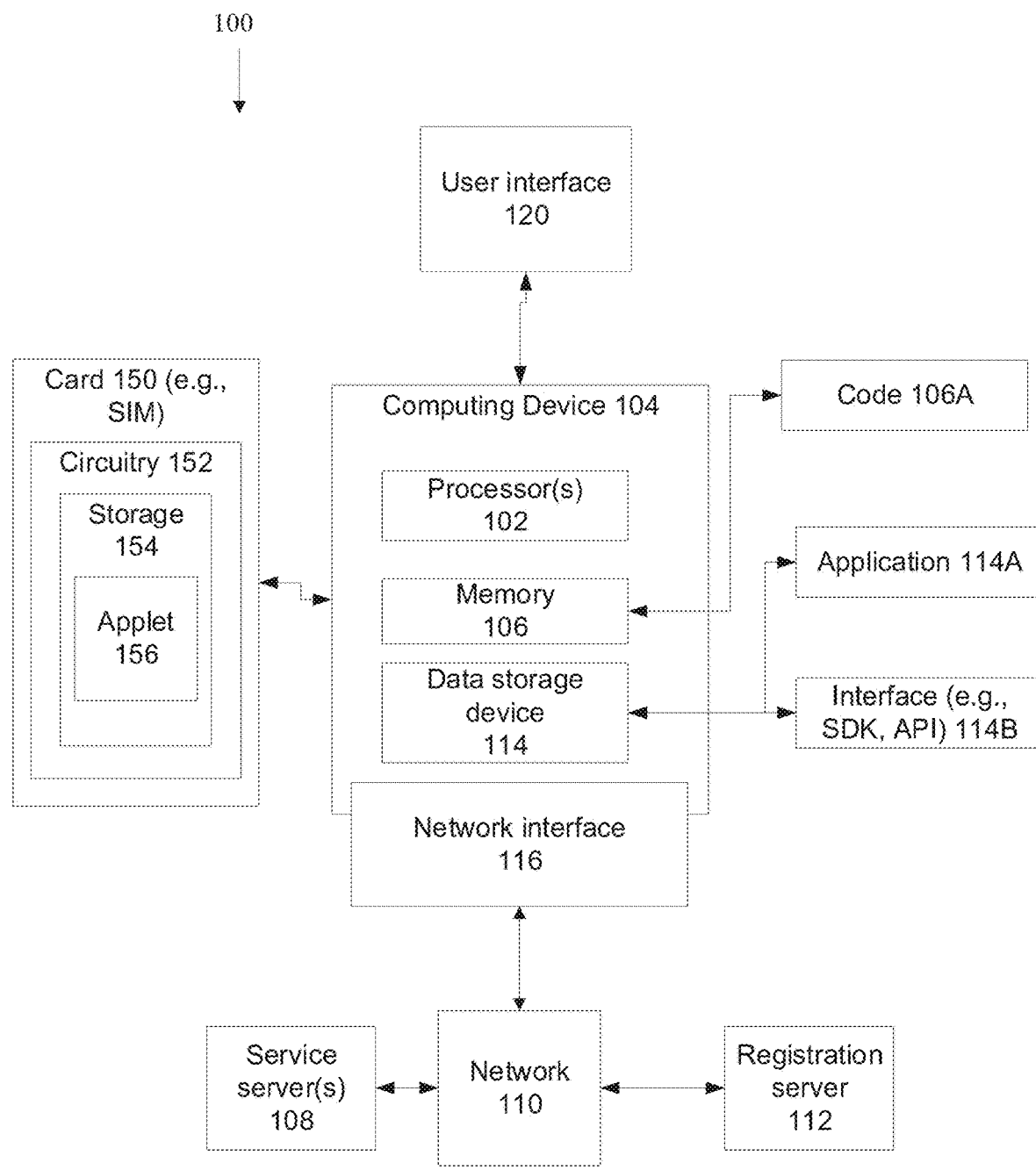
FIG. 1 is a block diagram of components of a system for on-device authentication, in accordance with some embodiments of the present invention.

The present invention, in some embodiments thereof, relates to cybersecurity and, more specifically, but not exclusively, to systems and methods for identity verification.

As used herein, the term subscriber identification module (SIM) card or SIM represents an exemplary implementation of a circuitry that is used by devices for cellular communication provided by a service provider. The term SIM is used as a not necessarily limiting example, as other implementations of circuitry may be used, for example embedded SIM (eSIM), and Universal Integrated Circuit Card (UICC). The term smart card may be used interchangeably with the term circuitry.

As used herein, the term mobile device represents an exemplary implementation of a computing device. The term mobile device is not necessarily limiting, and other devices that may be authenticated for cellular communication by a service provider, optionally using circuitry (e.g., SIM card that is inserted into a slot of the mobile device, eSIM that is embedded directly into the mobile device) installed therein, may be used.

An aspect of some embodiments of the present invention relates to systems, methods, a device, circuitry, and/or code instructions (stored on the circuitry and/or other data storage device) for on-device verification, that verifies whether the mobile device has installed therein circuitry (e.g., SIM, eSIM) which is authenticated for cellular communication by a service provider (may be referred to herein as "live SIM"). The on-device verification which may be performed within the mobile device itself, without necessarily leaving the mobile device via a network and/or cellular connection. An application is executed on the mobile device. The application is designed to require verification, for example, an application to make online purchase, a banking application, and a gaming application. The application may have installed therein a virtual interface (e.g., software development kit (SDK), application programming interface (API)) designed to communicate with an applet stored in a storage component of the circuitry (e.g., SIM card, eSIM card). The applet includes code instructions designed to be executed by a processor(s) of the mobile device. A communication session is established between the application and the applet, optionally via the virtual interface. An indication that the mobile device is authenticated for cellular communication by a service provider is provided, optionally by the applet is response to a validation request from the application. The indication may be, for example, a validation token computed based on a unique identifier that uniquely identifies the circuitry. A process of the application is validated based on the indication. For example, by comparing the validation token obtained from the applet to a reference token obtained based on the unique identifier shared with an external server, for example, a registration server during a registration process. In response to the validation, a security feature of the process may be triggered, for example, the user is allowed to login to the application, a transaction is performed, the user is allowed to make an online purchase, and/or the user is admitted to a game.

At least some implementation of the systems, methods, devices, and code instructions described herein address the technical problem of cybersecurity, in particular, validation of an identity, for example, validation of a digital ID for an online service (e.g., game, virtual conference), validation of a user performing a transaction, validation that the user is a real human and not an automated bot, and validating that OTP sent to one mobile device cannot be used by another device, and the like. Standard approaches for validation include, for example, passwords, PIN numbers, and codes sent to smartphone (e.g., via SMS). Such approaches are problematic. For example:

Digital payments fraud prevention: Malware running on a mobile phone may automatically subscribe the user of the phone to premium paid services and/or perform other online financial transaction without the knowledge of the user, by accessing one time passwords from text messages to the mobile phone to approve the charges.

ecommerce: Automatic bots may be programmed to find and purchase large quantities of low cost items on online web sites, for example, items on special sale. The low cost items are then resold for higher prices. Regular human users are deprived of the special sale, and the website providing the sale is deprived of additional sales that would otherwise be made by the human shoppers.

Regulatory: Unified Payment Interface (UPI) requires confirmation that there is a SIM card or an eSIM card on a device before making a transaction.

Online services: one person may obtain credentials of another person, and use those credential to log into to an online service of the other person, for example, play an online game, or attend a virtual conference.

At least some implementation of the systems, methods, devices, and code instructions described herein improve the technology of cybersecurity, in particular identification validation.

At least some implementation described herein address the above mentioned technical problem, and/or improve the above mentioned technical field, by enabling on-device verification.

The on-device verification may be performed within the mobile device itself, between an applet stored in a storage component of circuitry installed in the mobile device, and an application running on the mobile device, optionally where the application communicates with the applet using a virtual interface (e.g. SDK, API) designed to enable the communication. The on-device verification may be performed without necessarily leaving the mobile device, for example, without accessing an external server over a network and/or over a cellular communication channel provided by a service provider. The on-device verification help ensure a high level of security, since the communication between the circuitry and application on the mobile device is difficult to attack, while external data sources are more prone to attack.

The validation, which optionally is done on-device, helps ensure that the application is running on a mobile device with a "live SIM" card that has been authenticated for cellular communication by a service provider. The validation may verify that the same SIM cards that is currently installed in the mobile device on which the application is run was used during a registration process, for example, ensuring that a password used on the mobile device with SIM cannot be transferred to another mobile device with a different SIM. This helps prevent theft of passwords from the mobile device, for example, by malicious applications that obtain one time passwords (OTP) sent via SMS to the mobile device and use the OTP to steal money from the user.

The verification may alternatively or additionally helps ensure that a real human user using the mobile device is behind the process of the application, and/or helps exclude automated bots (which cannot be run on a large number of mobile devices with live SIM cards, since doing so would require each bot to run on a different mobile device which cannot be done practically)

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
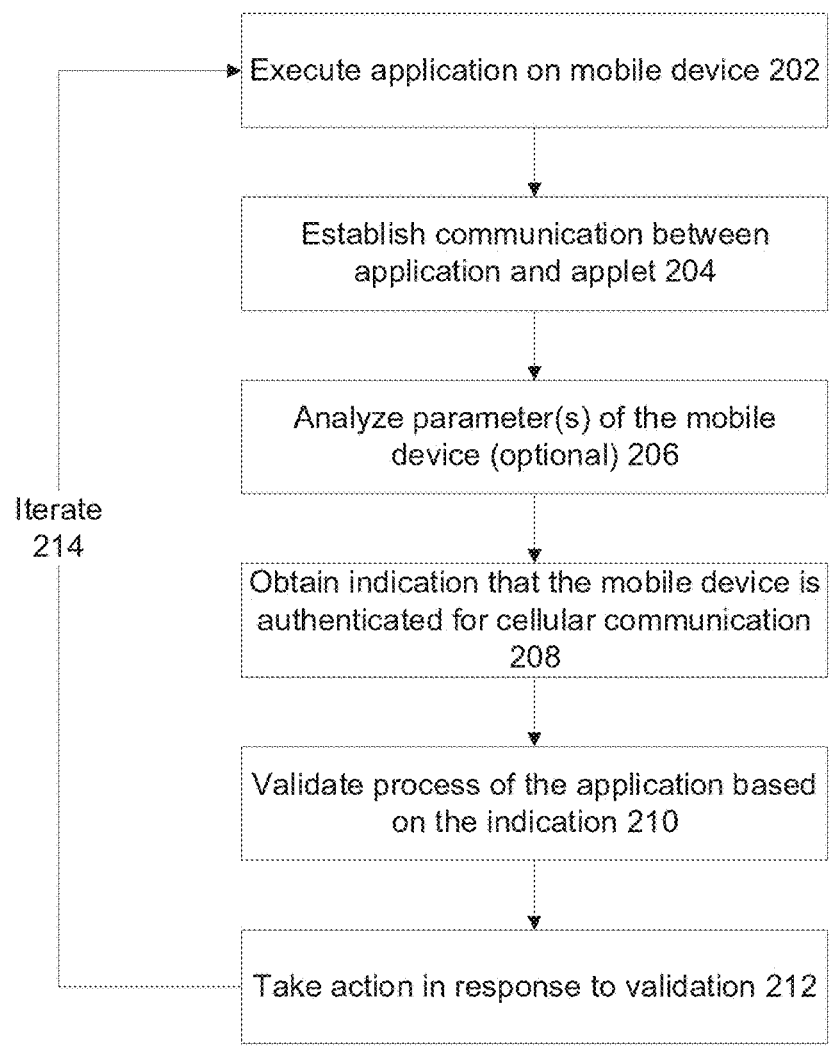
FIG. 2 is a flowchart of a method of on-device authentication, in accordance with some embodiments of the present invention.

Reference is now made to FIG. 1, which is a block diagram of components of a system 100 for on-device authentication, in accordance with some embodiments of the present invention. Reference is also made to FIG. 2, which is a flowchart 200 of a method of on-device authentication, in accordance with some embodiments of the present invention.

System 100 may implement the acts of the method described with reference to FIGS. 2-4 by processor(s) 102 of a computing device 104 executing code instructions stored in an applet 156 which is stored on a storage device 154 of circuitry 152, which may be located on a card 150. Processor(s) 102 may execute application 114A, interface (e.g., SDK, API) 114B, and/or code 106A, stored on a memory 106 and/or on a data storage device 114.

Card 150 may be, for example, a SIM card that is inserted into a slot of the computing device, and/or an eSIM card that is embedded in computing device 104.

Card 150 includes circuitry 152, which may include a storage component 154 storing applet 156, as described herein.

Applet 156 may be implemented, for example, as code instructions stored on a memory region of circuitry 152 and/or as hard-wired instructions. Applet 156 may be, for example, a program loaded into storage 154 by an external provider, for example, code of applet 156 is sent to cellular providers for loading on SIM cards that are provided to clients. Alternatively or additionally, applet 156 may be, for example, an existing identifier, an existing applet, and an existing code previously loaded on the circuitry 152 (e.g., hard-wired therein such as a unique identifier) and/or stored in storage 154, for example, by the cellular provider.

Computing device 104 may be implemented as, for example one or more and/or combination of: a mobile device (e.g., a Smartphone, a Tablet computer, a laptop computer, a wearable computer, glasses computer, and a watch computer), user equipment (UE), mobile station (MS), a camera, a computer, internet of things (IoT) device, a cellular modem, and a cellular hotspot, The computing device 104 may refer to, for example, a group of connected devices, a single client terminal, a server, a virtual server, a computing cloud, a virtual machine, a desktop computer, a thin client, a network node, and the like.

Hardware processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions 106A executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A and/or application 114A may implement one or more features and/or acts of the method described with reference to FIGS. 2-4 when executed by hardware processor(s) 102.

Computing device 104 may include a data storage device 114 for storing data, for example, one or more applications 114A which are used to access service server(s) 108 (e.g., payment application, online games, application for attending a virtual conference), and/or interface 114B used to interface with applet 156 (e.g., software development kit (SDK) and/or application programming interface (API)), as described herein. Data storage device 114 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, a cellular network, the internet, a local area network, a virtual network, a wireless network, a local bus, a point to point link (e.g., wired), and/or combinations of the aforementioned. Network 110 may be accessed via SIM card 150, and/or via another connection (e.g., Wi-Fi).

Computing device 104 may include a network interface 116 for connecting to network 110, for example, one or more of, a cellular interface for connecting to the cellular network (e.g., antenna), a network interface card, a wireless interface to connect to a wireless network, a physical interface for connecting to a cable for network connectivity, a virtual interface implemented in software, network communication software providing higher layers of network connectivity, and/or other implementations.

Computing device 104 may communicate over network 110 with registration server 112 for performing the registration process, as described herein.

Computing device 104 communicates over network 110 with service server 108 for accessing a service provided by the service server for which verification is required, for example, playing an online game, making a purchase, and attending a virtual conference.

Computing device 104 includes and/or is in communication with one or more physical user interfaces 120 that include a mechanism for a user to enter data (e.g., initiate access to service server 108 which requires identify verification) and/or view data (e.g., view indication of whether identify verification was completed successfully). Exemplary user interfaces 120 include, for example, one or more of, a touchscreen, a display, a virtual reality display (e.g., headset), gesture activation devices, a keyboard, a mouse, and voice activated software using speakers and microphone.

Referring now back to FIG. 2, at 202, the processor of the mobile device executes an application hosted on the mobile device.

The application includes a process and/or is associated with a process that includes a secure service dependent on validation that the mobile device on which the application is running has the circuitry installed therein (e.g., SIM card) and that the mobile device with circuitry is authenticated for cellular communication by a server provider, i.e., that the SIM is "live". The validation may be required by the application and/or by a service server with which the application is communicating. Examples of applications and processes include: banking, password verification, user credential verification, online purchases, online gaming, online attendance of a conference, and the like. The validation that the application is running on a mobile device with live SIM installed therein helps ensure that there is a real human user using the mobile device rather than an automated bot, and/or helps ensure that the password/user credentials/other sensitive data is tied to the specific SIM card, where the validation ensures that the same specific SIM card being used now has been used previously.

At 204, a communication (e.g., session, channel) is established between the application and an applet stored in a storage component of the circuitry installed in the mobile device, The communication may be via a virtual interface (e.g., SDK, API), which may be installed within the application and/or used by the application. The virtual interface is designed to communicate with the applet.

The application may sent a validation request to the applet. Alternatively or additionally, the application may access data of the applet directly.

The application and/or applet may be registered by a registration server during a registration process, prior to obtaining the validation request. The registration process may be triggered, for example, upon creation of new sensitive data, for example, a password and/or user credential and/or upon download of the application and/or upon installation of the applet and/or circuitry. The registration process may help ensure that the circuitry that was used for registration is the same circuitry that is currently installed in the mobile device. This helps secure the sensitive data (e.g., the passwords and/or user credentials), by verifying that the sensitive data is not being used on another mobile device with other circuitry.

Optionally, the application and the applet are paired. The pairing may be done prior to establishment of the communication, and/or using the communication once established. The application and applet may be paired in a 1:1 manner, where a single instance of the application is paired with a single applet on a single circuitry. When there are multiple different applications (e.g., gaming, online purchase, online banking) each application may be paired with the same applet. The pairing helps avoid transfer of sensitive data between different mobile devices.

At 206, the applet may analyze one or more parameters of the mobile device.

Examples of parameters include: calls currently being made or recently made using the circuitry of the authenticated mobile device, text messages currently being sent or recently sent using the circuitry of the authenticated mobile device, location of the mobile device is currently changing or has recently changed during a recent time interval (e.g., obtained from a GPS in the mobile device), and data is currently being downloaded or has recently been downloaded over a cellular network using the circuitry of the authenticated mobile device.

The analysis is done to determining likelihood that a human user is currently using and/or has recently been using the mobile device. For example, recent and/or current voice conversations are strong indicators that a human is likely using the mobile device.

The analysis may be triggered in response to the validation request from the application.

The indication described with reference to 208 may be generated when the likelihood of the human user is determined, for example, the probability of human user is about a threshold. Alternatively, when the analysis of the parameter(s) indicating non-likelihood that the human user is using the mobile device (e.g., probability of a human user is below the threshold), the validation process may be terminated, and/or an alert may be sent to the application and a service server in communication with the application, and/or to another device, for example, for further investigation and/or actions. For example, when the location of the phone has not changed, this may be due to the user being stationary, or due to a malicious attack. To confirm a real user, another action may be taken, for example, sending a voice call and/or SMS to the user that requires a response.

At 208, an indication that the mobile device is authenticated for cellular communication by a service provider is obtained.

Exemplary indications include:

A unique identifier that uniquely identifies the circuitry. The unique identifier may be generated during a registration process that registers the applet and/or the application with a registration server. The unique identifier may be generated after and/or as part of the pairing process. The unique identifier may be generated based on unique data that may be hard-wired into the circuitry, for example, based on the international mobile subscriber identity (IMSI) number assigned to the circuitry, and/or other unique encoding hard-wired into the circuitry. The hard-wiring ensures uniqueness of the unique identifier, and/or helps ensure that the unique identifier is tamper proof.

A validation token computed based on a unique identifier that uniquely identifies the circuitry. The validation token may be a validation key. For example, the unique identifier is fed into a cryptographic process that computes a cryptographic key which is provided as the validation token.

A validation token that is computed based on a combination of the unique identifier and metadata, for example, a hash of the unique identifier and metadata fed into a hashing process. The metadata may be provided by the application to the applet, for example, in the validation request.

The indication may be shared with a service server that is in communication with the application. The unique identifier and/or metadata may be shared with the service server. The unique identifier may be shared with a registration server during registration of the applet running on the mobile device authenticated for cellular communication. Sharing of the indication, unique identifier, metadata, and/or other data described herein may be performed over a secured channel such as a secured Internet protocol channel, a secured Bearer Independent Protocol (BIP) channel, and/or any other suitable secured channel.

The indication may be generated by different entities and/or obtained from different entities and/or provided to different entities. For example, the indication may be obtained by the applet, and sent to the application. The applet may provide the indication to the application in response to a validation request from the application. Alternatively, the application obtains the indication directly from the applet. For example, the application may use software tools such as, for example, the interface (e.g., SDK, API) in order to access the SIM card's file system and/or other software tools such as SmartCard API and/or software tools provided by Secure Element Evaluation Kit (SEEK) open source project.

Alternatively, the indication is obtained by the application from a service server that generates the indication. Alternatively, the indication is obtained and/or generated by the service server, which does not necessarily provide it to the application.

At 210, the process of the application is validated based on the indication.

The validation may be performed by the application, by the service server that communicates with the application, by a notification generated by the applet and presented on a display of the mobile device and/or by other processes.

Some exemplary approaches for validating the process of the application based on the indication are now described.

Optionally, the process of the application is validated by the notification. In an exemplary implementation, a user using the application and/or accessing the service server may be requested to enter data to continue with a process. The data may be, for example, the phone number of the mobile device, a password, and a user ID. The process may be, for example making a purchase, registration, and/or making a financial transfer. In response to entering the data, the notification is generated by the applet and presented on the display of the mobile device, for example, implemented as an operating system notification, and/or FLASH notification. The notification indicates to the user to provide an approval, for example, to enter a code, and/or press an "OK" icon. The approval provided by the user triggers validation of the process of the application. The approval provided by the user may directly trigger the validation of the process of the application, and/or additional approvals may be required to validation the process of the application, for example, approvals provided by the application and/or service server, for example, as described herein. The validation by the notification may be combined with other validation approached described, herein, for example, two or more other approval approaches (e.g., as described herein) may be required for validation. The validation of the process triggered by the notification generated by the applet and presented on the display of the mobile device provides a high level of security. The notification is generated by the applet running on the circuitry (e.g., SIM, eSIM) installed in the mobile device, and presented on the display of the mobile device, i.e., on device verification, which is very secure against external malicious attached. The notification is different than an external message (e.g., OTP provided via SMS) arriving from a source external to the mobile device, and/or does not require the user to access an external account and the like, all of which are prone to malicious attack.

The application may perform the validation by verifying that the indication matches a reference. For example, that a validation token computed from the unique identifier matches a reference token. The reference token may be obtained, for example, from the registration server. The registration server may compute the reference token from the unique identifier that was shared by the applet during the registration process. The match between the validation token, which is recently obtained based on the unique identifier, with the reference token, which is based on the previously shared unique identifier, indicates that the application is running on the mobile device that the same circuitry that was used for the registration.

The service server may perform the validation. The indication may include a unique identifier that is shared with the service server. The unique identifier may be shared with the service server in a communication that occurred prior to the current request for validation. For example, the unique identifier is provided to the service server during the registration process. The validating the process is performed by the service server by verifying that a validation token computed from the unique identifier obtained from the applet (e.g., directly, or via the application) matches a reference token computed from the shared unique identifier. The match between the validation token and the reference token indicates that the application is loaded on the mobile device with the same circuitry installed that used to generate the unique identifier during the registration process.

As discussed above, the indication may include a validation token that is computed from the unique identifier that uniquely identifies the circuitry and metadata, optionally obtained from the application. The validation token may be computed as a hash of the unique identifier and the metadata. The validation token may be computed by executing instructions of the applet. The unique identifier and the metadata are shared with the service server. The unique identifier may be provided to the service server during the registration process, as described herein. The service server validates that the validation token matches a reference token computed from the shared unique identifier and from the shared metadata, for example, by computing the hash of the shared unique identifier and the shared metadata.

There may be different implementations of the data included in the metadata. The metadata may be obtained from different entities. For example:

The metadata may include challenge data obtained from the service server. In such implementation, the challenge data may be sent by the server to the application in response to an attempt by the application to access a service hosted by the service server. For example, the challenge data is sent for confirmation of identity of a user in response to the user attempting to access an online game, attend a virtual conference, and other services that require identity verification. The challenge data may be, for example, a random alphanumeric sequence that is randomly generated by the service server. The application may pass the challenge data to the applet via the SDK (or other interface) as part of the request for verification. The applet computes the verification token using the challenge data and unique identifier, for example, as a hash. The application sends the verification token to the service server. The service server verifies that the verification token matches the reference token computed from the same challenge data (which was previously sent to the application) and from the shared unique identifier, for example, a hash thereof. The validation by the service server may indicate non-likelihood that the application is a bot that is automatically attempting to access the service over a network, i.e., likelihood that a real user is behind the application.

The metadata may include transaction data. For example, indicating a payment for a purchase made by the user to an online store associated with the service server. In such implementation, the application may generate the transaction data, for example, in response to the user attempting the make an online purchase. The application may pass the transaction data to the applet via the SDK (or other interface) as part of the request for verification. The applet computes the verification token using the transaction data and unique identifier (which has been shared with the service server), for example, as a hash. The application sends a message to the service server, where the message includes the verification token and the transaction data. The service server computes a reference token from the transaction data extracted from the message and from the shared unique identifier, for example, a hash thereof. The service server verifies that the verification token extracted from the message matches the computed reference token. The server may, in response to the validation, execute the transaction according to the transaction data extracted from the message. The validation by the service server may indicate non-likelihood that the application is a bot that is automatically attempting to access the service over a network, i.e., likelihood that a real user is behind the application.

The metadata may include user credentials used by a user to register for the service hosted by the service server. The user credentials may be used in the examples described above where the metadata is obtained from the server (e.g., as described with reference to the challenge data) and/or where the metadata is obtained from the application (e.g., as described with reference to the transaction data). The validation by the service server may indicates that a user is using the same user credentials with the same authenticated mobile device to access the service that were used to register for the service.

The metadata may include a salt that is randomly generated, for example, per validation instance. For example, the salt is generated in response to each attempt by the application to access the service on the service server, and/or the sale is generated for each online purchase. The salt may be generated, for example, by the application, by the applet, by the service server, by the registration server, and/or by other entities. The salt may be used in the examples described above where the metadata is obtained from the server (e.g., as described with reference to the challenge data) and/or where the metadata is obtained from the application (e.g., as described with reference to the transaction data). The validation by the service server may indicates that a user is using the same user credentials with the same authenticated mobile device to access the service that were used to register for the service.

At 212, an action is taken in response to the validation. For example, the application is granted access to the service hosted by the service server, the process on the application is allowed to continue, the service server performs the transaction, and the like.

At 214, one or more features described with reference to 202-212 are iterated, for performing a re-validation that the mobile device running the application is authenticated for cellular communication by a service provider. The re-validation may be done, for example, for a new application being installed on the mobile device, a single time such as when the application initially attempts to access the service on the service server, each time the application is executed by the user, every time interval (e.g., every hour, every day, and the like), each attempt by the application to run the process (e.g., each online purchase, each access to the game), when the mobile device exists a certain geographical area, when the mobile device leaves a coverage area of a cellular network, when a configuration of the mobile device changes, and/or any other determined condition.

Figure 3:
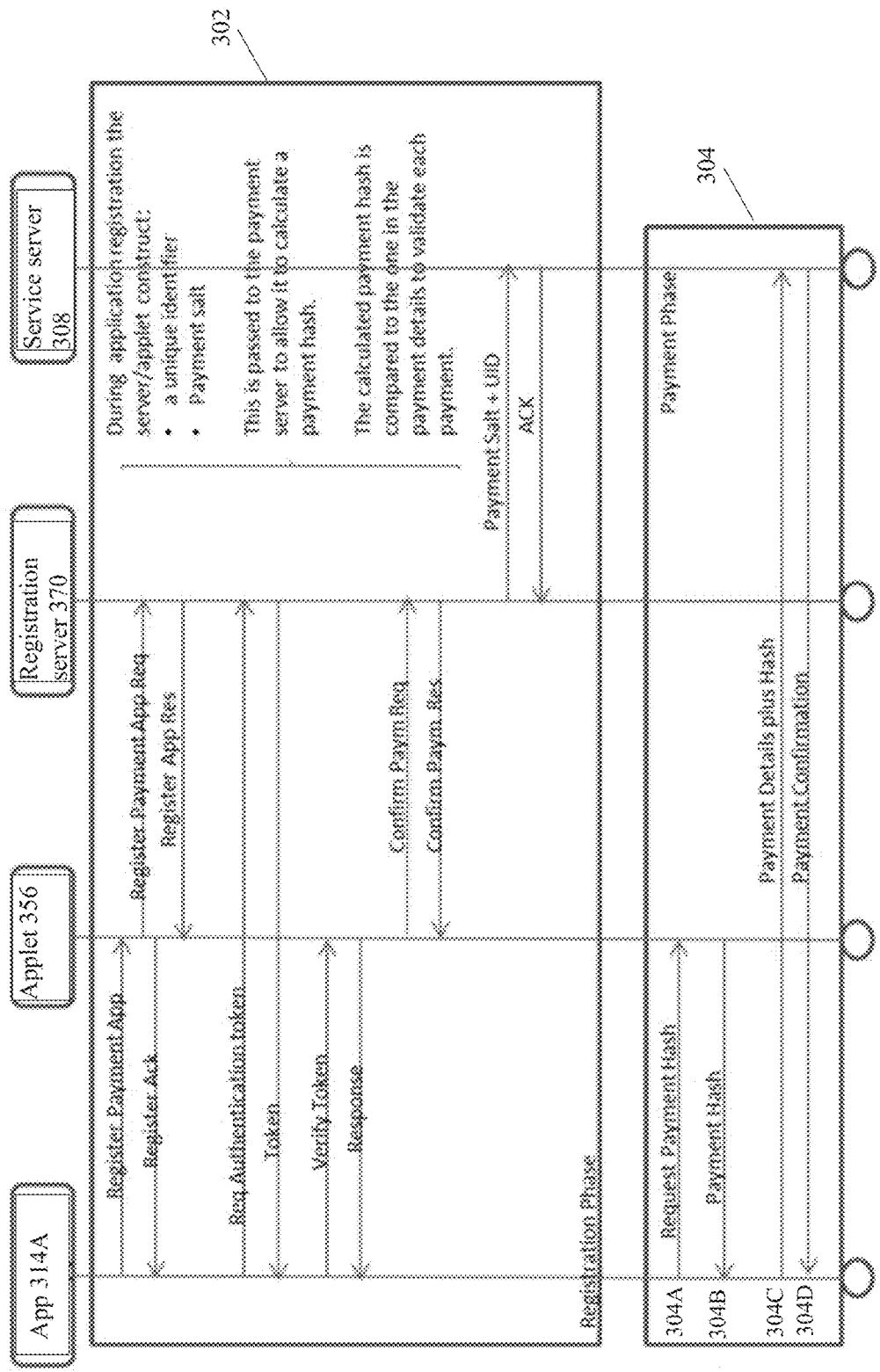
FIG. 3 is a dataflow diagram representing an exemplary dataflow for validating that there is a SIM card installed in the mobile device for enabling a transaction, in accordance with some embodiments of the present invention.

Reference is now made to FIG. 3, which is a dataflow diagram representing an exemplary dataflow for validating that there is a SIM card (or eSIM or other card) installed in the mobile device for enabling a transaction between an application (app) 314A running on the mobile device and another entity such as a service server 308 (also referred to herein as a payment server), in accordance with some embodiments of the present invention. The dataflow described with reference to FIG. 3 may be implemented by components of system 100 described with reference to FIG. 1. The dataflow described with reference to FIG. 3 may be based on, combined with, and/or may include, features of the method described with reference to FIG. 2. For example, the dataflow described with reference to FIG. 3 may be an exemplary use case implementation of the method described with reference to FIG. 2.

The dataflow described with reference to FIG. 3 may be implemented, for example, to meet a unified payments interface (UPI) regulation in India, which requires confirmation that there is a SIM card (or eSIM) installed in the mobile device before allowing an application installed on the mobile device to make a transaction, for example, an online purchase by app 314A accessing an online store for which service server 308 handles payment transactions.

The dataflow described with reference to FIG. 3 may be used to verify that app 314A is hosted on a mobile device that has the same SIM card (running applet 356) that was used when registering app 356, and that the SIM card is live (i.e., authenticated for cellular communication by a service provider). The verification may be required in order to process the payment transactions.

The verification may help reduce likelihood that an automated bot is attempting to make the purchase, by verifying that the transaction is being initiated from a mobile device with active SIM card, where use by an automated process which is not human is highly unlikely.

At 302, a registration process is performed. The registration process may be performed by a registration server 370 based on data obtained from an applet 356 stored in circuitry installed within the mobile device. The registration process may be performed, for example, after communication is established between the application and the applet as described with reference to 204 of FIG. 2.

During the registration process, registration server 370 and applet 356 may generate a unique identifier and/or payment salt, for example, using data of the circuitry (e.g., hard-wired therein), and/or generating a cryptographic key pair, or other approaches. The unique identifier and/or payment salt is shared with service server 308 to enable service server 308 to compute a reference payment hash for validation. Service server 308 compares the reference payment hash to another hash that is computed from data extracted from a message obtained from app 314A, as described in more detail in FIG. 3 and below. The match validates the transaction.

At 304, a payment phase is performed. The payment phase may include the following dataflows:

At 304A, app 314A sends a request to applet 356 to obtain a payment hash. App 314A may use the interface described herein (e.g. SDK) to communicate with applet 356. The request may include transaction data based on the transaction that the app 314A is attempting to perform.

At 304B, applet 356 provides a payment hash to app 314A. Applet 356 may compute the payment hash, optionally as a hash of the unique identifier and/or payment (e.g., computed during the registration phase), and data extracted from the request (e.g., the transaction data).

At 304C, app 314A sends a message to service server 308. The message may include the payment hash obtained from apple 356, and the transaction data (which was provided to applet 356 to compute the payment hash). The SDK may append the payment hash to the transaction data that is sent to the service server 308.

At 304D, service server 308 sends a confirmation that payment has been processed to app 314A. Service server 308 may validate the transaction by verifying that the payment hash obtained from app 314A matches a reference hash computed by service server 308, the reference hash computed from the unique identifier and/or payment salt generated during the registration process and shared with service server 308 and from the transaction data obtained from app 314A (e.g., extracted from the message). The match indicates high likelihood that app 314A is hosted on a mobile device with a live SIM card that was used during the registration phase, making it highly unlikely that the transaction is being attempted by a non-human automated bot.

Figure 4:
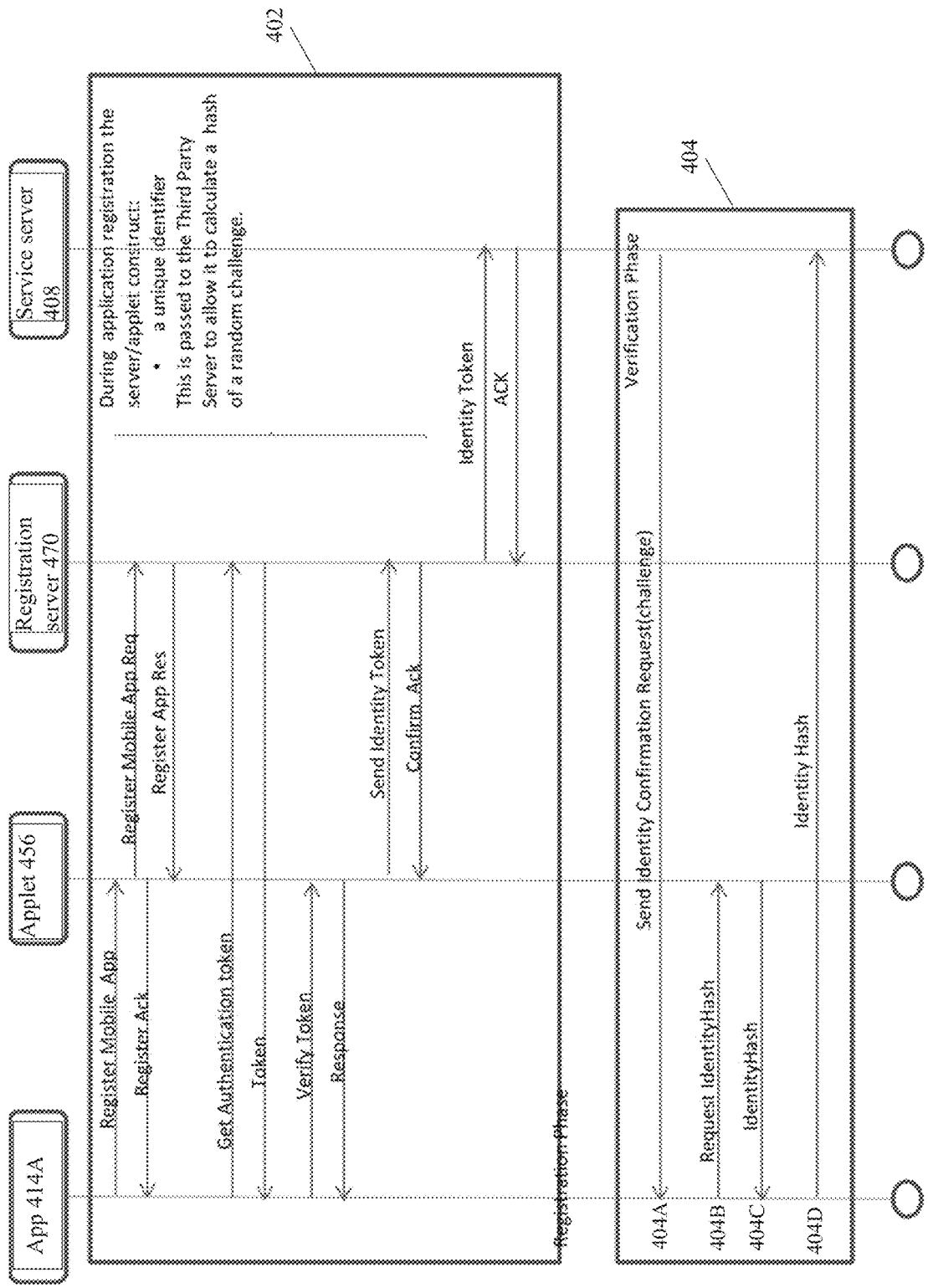
FIG. 4 is a dataflow diagram representing an exemplary dataflow for validating that there is a SIM card installed in the mobile device for enabling an application running on the mobile device to access a service hosted by a service server, in accordance with some embodiments of the present invention.

Reference is now made to FIG. 4, which is a dataflow diagram representing an exemplary dataflow for validating that there is a SIM card (or eSIM or other card) installed in the mobile device for enabling an application (app) 414A running on the mobile device to access a service hosted by a service server 408, for example, prevention of fraud in transactions, reducing likelihood that the buyer is a non-human bot, and confirming a digital for accessing a service such as a game or virtual conference, in accordance with some embodiments of the present invention. The dataflow described with reference to FIG. 4 may be implemented by components of system 100 described with reference to FIG. 1. The dataflow described with reference to FIG. 4 may be based on, combined with, and/or may include, features of the method described with reference to FIG. 2. For example, the dataflow described with reference to FIG. 4 may be an exemplary use case implementation of the method described with reference to FIG. 2.

The dataflow described with reference to FIG. 4 may be used to verify that app 414A is hosted on a mobile device that has the same SIM card (running applet 456) that was used when registering app 456, and that the SIM card is live (i.e., authenticated for cellular communication by a service provider). The verification may be required in order to provide access to the service hosted by service server 408 (also referred to herein as a third party server). The verification may help prevent theft of sensitive data (e.g., identity and/or passwords), by linking the sensitive data to the circuitry installed in the mobile device which makes it difficult to transfer the sensitive data to another mobile device with other circuitry and/or to a device that has no circuitry. The verification may help reduce likelihood that an automated bot is attempting to access the service, by verifying that the service is being accessed from a mobile device with active SIM card, where use by an automated process which is not human is highly unlikely.

At 402, a registration process is performed. The registration process may be performed by a registration server 470 based on data obtained from an applet 456 stored in circuitry installed within the mobile device. The registration process may be performed, for example, after communication is established between the application and the applet as described with reference to 204 of FIG. 2.

During the registration process, registration server 470 and applet 456 may generate a unique identifier, for example, using data of the circuitry (e.g., hard-wired therein), and/or generating a cryptographic key pair, or other approaches. The unique identifier is shared with service server 408 to enable service server 408 to compute a reference identity hash for validation. Service server 408 compares the reference identity hash to another identity hash that is computed from data obtained from app 414A, as described in more detail in FIG. 4 and below. The match validates the identity.

At 404, a verification phase is performed. The verification phase may include the following dataflows:

At 404A, an identity confirmation request, also referred to as a challenge, is sent by service server 408 to app 414A. The challenge may be, for example, randomly generated data, such as a random alphanumeric sequence. The challenge may be sent in response to an attempt by app 414A to access a secure service hosted by service server 408.

At 404B, app 414A sends a request to applet 456 to obtain an identity hash. The request includes the challenge obtained from service server 408. App 414A may use the interface described herein (e.g. SDK) to communicate with applet 456.

At 404C, applet 456 provides the identity hash to app 414A. Applet 456 may compute the identity hash, optionally as a hash of the unique identifier and the challenge.

At 404D, app 414A sends the identity hash to service server 408.

Service server 408 may validate the identity by verifying that the identity hash obtained from app 414A matches a reference hash computed by service server 408. The reference hash is computed from the unique identifier generated during the registration process and shared with service server 408 and from the challenge (which was previously sent to app 414A). The match indicates high likelihood that app 414A is hosted on a mobile device with a live SIM card that was used during the registration phase, making it highly unlikely that the access is being attempted by a non-human automated bot and/or that the access is being attempted by another human using another mobile device with another SIM using a stolen identity.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant circuitries will be developed and the scope of the term circuitry is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for on-device verification, comprising:
    using at least one processor of a mobile device for:
        executing an application;
        establishing a communication with an applet stored in a storage component of circuitry installed in the mobile device;
        obtaining an indication that the mobile device is authenticated for cellular communication by a service provider,
        wherein the indication comprises a self-generated unique identifier generated based on unique data that is hard-wired into the circuitry; and validating a process of the application based on the indication comprising the unique identifier generated based on unique data that is hard-wired into the circuitry that indicates that the mobile device is authenticated for cellular communication by a service provider.

2. The method of claim 1, further comprising executing instructions of the applet for:
receiving a validation request from the application, and
providing the indication that the mobile device is authenticated to the application,
wherein the indication comprises a validation token based on a unique identifier that uniquely identifies the circuitry.

3. The method of claim 1, wherein the process of the application comprises a secure service dependent on the mobile device having the circuitry installed therein and being authenticated for cellular communication.

4. The method of claim 1, wherein the validating the process is further performed by a notification generated by the applet presented on a display of the mobile device, wherein the notification triggers validation the process of the application in response to an approval indication entered by a user.

5. The method of claim 4, wherein the indication comprises a unique identifier that is shared with a registration server during registration of the applet running on the mobile device authenticated for cellular communication, wherein the application performs the validating by verifying that the indication matches a reference token computed based on the shared unique identifier obtained from the registration server, wherein the match indicates that the application is running on the mobile device with same circuitry that has been used for registration.

6. The method of claim 1, further comprising:
in response to a validation request from the application, analyzing at least one parameter of the mobile device, determining likelihood that a human user is using the mobile device according to the analysis, and
validating the process in response to the determination that the human user is likely using the mobile device.

7. The method of claim 6, wherein the at least one parameter is selected from a group consisting of: calls made using the circuitry of the authenticated mobile device, text messages sent using the circuitry of the authenticated mobile device, location of the mobile device has changed during a recent time interval, and data downloaded over a cellular network using the circuitry of the authenticated mobile device.

8. The method of claim 6, further comprising wherein in response to an analysis of the at least one parameter indicating non-likelihood that the human user is using the mobile device, the applet comprises instructions for terminating the validation of the process and sending an alert to at least one of the application and a service server.

9. The method of claim 1, wherein the indication comprises a unique identifier that is shared with a service server, wherein the validating the process is performed by the service server by verifying that a validation token computed from the unique identifier obtained from the applet matches a reference token computed from the shared unique identifier, wherein in response to the validating by the service server, the application is granted access to a service hosted by the server.

10. The method of claim 9, wherein the match between the validation token and the reference token indicates that the application is loaded on the mobile device with circuitry installed thereon that is authenticated for cellular communication, wherein the circuitry installed in the mobile device was used to generate the unique identifier during a registration process.

11. The method of claim 1, wherein the indication comprises a validation token, and further comprising executing instructions of the applet for: computing the validation token from a unique identifier that uniquely identifies the circuitry and metadata obtained from the application, wherein the unique identifier and the metadata are shared with a service server, and wherein the service server validates that the validation token matches a reference token computed from the shared unique identifier and from the shared metadata.

12. The method of claim 11, further comprising executing instructions of the applet for computing the validation token as a hash of the unique identifier and the metadata, wherein the service server validates that the validation token matches the reference token computed as a hash of the shared unique identifier and the shared metadata.

13. The method of claim 11, wherein the metadata comprises challenge data obtained from the service server in response to an attempt by the application to access a service hosted by the service server.

14. The method of claim 11, wherein the metadata comprises transaction data associated with a transaction which is being attempted to be performed by the application accessing the service server.

15. The method of claim 14, wherein the application sends a message to the service server, the message including the validation token and the transaction data, wherein the service server validates that the validation token matches the reference token computed from the shared unique identifier and from the transaction data included in the message.

16. The method of claim 15, wherein in response to the validation of the transaction, the service server further performs the transaction using the transaction data included in the message.

17. The method of claim 11, wherein the metadata comprises user credentials used by a user to register for the service hosted by the service server, wherein the validation by the service server indicates that a user is using the same user credentials with the same authenticated mobile device to access the service that were used to register for the same service.

18. The method of claim 9, wherein the validation by the service server indicates non-likelihood that the application is a bot that is automatically attempting to access the service over a network.

19. The method of claim 1, wherein the unique data that is hard-wired into the circuitry comprises an international mobile subscriber identity (IMSI).

20. The method of claim 1, wherein the application directly obtains the IMSI from the applet via the communication.

21. The method of claim 20, wherein the application directly obtains the IMSI from the applet without requiring the mobile device Operating System authorization for authentication with the circuitry and/or without requiring the access to service provider private keys in the circuitry.

22. The method of claim 20, wherein directly obtains comprises without the user inputting the unique identifier and without obtaining the unique identifier from a source external to the mobile device.

23. The method of claim 1, wherein the unique data comprises a cellular phone number, and wherein validating the process of the application comprises validating the process of the application based on validating an indication of the cellular phone number at a service server that provides and/or managers the application.

24. The method of claim 23, wherein the validating the process of the application is performed without requiring the mobile device Operating System authorization for authentication with the circuitry and/or without requiring the access to service provider private keys in the circuitry.

25. The method of claim 1, wherein the process of the application is validated using self-generated circuitry identifiers that do not require the mobile device Operating System authorization for authentication with the circuitry and/or do not require access to service provider private keys in the circuitry.

26. A system for on-device verification, comprising:
at least one processor of a mobile device executing instructions for:
executing an application;
establishing a communication with an applet stored in a storage component of circuitry installed in the mobile device;
obtaining an indication that the mobile device is authenticated for cellular communication by a service provider,
wherein the indication comprises a unique identifier generated based on unique data that is hard-wired into the circuitry; and
validating a process of the application based on the indication comprising the unique identifier generated based on unique data that is hard-wired into the circuitry that indicates that the mobile device is authenticated for cellular communication by a service provider.

27. A non-transitory medium of a mobile device storing program instructions for on-device verification, which, when executed by a processor of the mobile device, cause the processor to:
execute an application;
establish a communication with an applet stored in a storage component of circuitry installed in the mobile device;
obtain an indication that the mobile device is authenticated for cellular communication by a service provider,
wherein the indication comprises a unique identifier self-generated based on unique data that is hard-wired into the circuitry; and
validate a process of the application based on the indication comprising the unique identifier generated based on unique data that is hard-wired into the circuitry that indicates that the mobile device is authenticated for cellular communication by a service provider.

* * * * *